US007634104B2

(12) United States Patent
Alasia et al.

(10) Patent No.: US 7,634,104 B2
(45) Date of Patent: Dec. 15, 2009

(54) ILLUMINATED DECODER

(75) Inventors: Alfred V. Alasia, Lake Worth, FL (US); Alfred J. Alasia, Royal Palm Beach, FL (US); Thomas C. Alasia, Lake Worth, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 871 days.

(21) Appl. No.: 10/872,232

(22) Filed: Jun. 18, 2004

(65) Prior Publication Data

US 2004/0264737 A1 Dec. 30, 2004

Related U.S. Application Data

(60) Provisional application No. 60/483,746, filed on Jun. 30, 2003.

(51) Int. Cl.
*G06K 9/00* (2006.01)

(52) U.S. Cl. ........................ 382/100; 382/232; 382/233

(58) Field of Classification Search ................. 382/324, 382/100, 112, 232, 233; 235/462.45, 462.25, 235/462.21, 462.42; 355/62, 52, 46, 18, 355/54; 378/2, 21; 380/54; 348/161; 720/600
See application file for complete search history.

(56) References Cited

U.S. PATENT DOCUMENTS

| | | | | |
|---|---|---|---|---|
| 3,524,395 A | | 8/1970 | Alasia | 396/329 |
| 3,635,778 A | | 1/1972 | Rice et al. | 156/580 |
| 3,642,346 A | | 2/1972 | Dittmar | 359/463 |
| 3,746,872 A | * | 7/1973 | Ashe et al. | 378/2 |
| 3,781,109 A | * | 12/1973 | Mayer et al. | 355/52 |
| 3,784,289 A | | 1/1974 | Wicker | 359/896 |
| 3,937,565 A | | 2/1976 | Alasia | 380/54 |
| 4,092,654 A | | 5/1978 | Alasia | 396/330 |
| 4,147,295 A | | 4/1979 | Nojiri et al. | |
| 4,198,147 A | | 4/1980 | Alasia | 396/330 |
| 4,303,307 A | | 12/1981 | Tureck et al. | 283/91 |
| 4,715,623 A | | 12/1987 | Roule et al. | 283/91 |
| 4,914,700 A | | 4/1990 | Alasia | 380/54 |
| 5,027,401 A | | 6/1991 | Soltesz | 380/54 |
| 5,113,213 A | | 5/1992 | Sandor et al. | 355/22 |
| 5,178,418 A | | 1/1993 | Merry et al. | 283/73 |
| 5,195,122 A | | 3/1993 | Fabian | |

(Continued)

FOREIGN PATENT DOCUMENTS

EP 0598357 B1 5/1994

(Continued)

OTHER PUBLICATIONS

"*UV Inks*", http://www.maxmax.com, pp. 1-2, printed Jun. 6, 2004.

(Continued)

*Primary Examiner*—Anh Hong Do
(74) *Attorney, Agent, or Firm*—Hunton & Williams LLP

(57) ABSTRACT

An illuminated decoder is disclosed. The illuminated decoder is useful determining genuine items from counterfeit items by decoding encoded images printed on genuine items to reveal an authentication image in low light situations. The illuminated decoder includes a housing, a lens configured for optically decoding encoded images, and at least one light source attached to the housing.

19 Claims, 7 Drawing Sheets

U.S. PATENT DOCUMENTS

| | | | | |
|---|---|---|---|---|
| 5,195,435 | A | 3/1993 | Morrone et al. | 101/151 |
| 5,303,370 | A | 4/1994 | Brosh et al. | 380/51 |
| 5,396,559 | A | 3/1995 | McGrew | 380/54 |
| 5,438,429 | A | 8/1995 | Haeberli et al. | 358/445 |
| 5,576,527 | A | 11/1996 | Sawanobori | |
| 5,708,717 | A | 1/1998 | Alasia | 380/51 |
| 5,735,547 | A | 4/1998 | Morelle et al. | 283/67 |
| 5,830,609 | A | 11/1998 | Warner et al. | 430/10 |
| 5,904,375 | A | 5/1999 | Brugada | 283/85 |
| 5,974,150 | A | 10/1999 | Kaish et al. | 713/179 |
| 6,084,713 | A | 7/2000 | Rosenthal | 359/619 |
| 6,104,812 | A | 8/2000 | Koltai et al. | 380/51 |
| 6,171,734 | B1 | 1/2001 | Warner et al. | 436/10 |
| 6,222,650 | B1 | 4/2001 | Long | 359/2 |
| 6,252,963 | B1 | 6/2001 | Rhoads | 380/54 |
| 6,256,150 | B1 | 7/2001 | Rosenthal | 359/619 |
| 6,260,763 | B1 | 7/2001 | Svetal | |
| 6,280,891 | B2 | 8/2001 | Daniel et al. | 430/10 |
| 6,343,138 | B1 | 1/2002 | Rhoads | 382/100 |
| 6,385,352 | B1 * | 5/2002 | Roustaei | 382/324 |
| 6,414,794 | B1 | 7/2002 | Rosenthal | 359/619 |
| 6,549,503 | B2 * | 4/2003 | Matos | 720/600 |
| 6,729,546 | B2 * | 5/2004 | Roustaei | 235/462.45 |
| 6,817,525 | B2 | 11/2004 | Piva et al. | |
| 2001/0005570 | A1 | 6/2001 | Daniel et al. | 430/321 |
| 2002/0008380 | A1 | 1/2002 | Taylor et al. | 283/72 |
| 2002/0185857 | A1 | 12/2002 | Taylor et al. | 283/72 |
| 2003/0012562 | A1 | 1/2003 | Lawandy et al. | 386/126 |
| 2003/0015866 | A1 | 1/2003 | Cioffi et al. | 283/72 |
| 2003/0137145 | A1 | 7/2003 | Fell et al. | 283/72 |

FOREIGN PATENT DOCUMENTS

| | | | | |
|---|---|---|---|---|
| EP | 1147912 | A2 | 10/2001 | |
| GB | 1407065 | | 9/1975 | |
| WO | WO 92/04692 | | 3/1992 | |
| WO | WO 93/15491 | | 8/1993 | |
| WO | WO 94/07326 | | 3/1994 | |
| WO | WO 98/15418 | | 4/1998 | |
| WO | WO 01/87632 | A1 | 11/2001 | |
| WO | PCT/US04/019642 | | 2/2005 | 235/462.01 |

OTHER PUBLICATIONS

"*Security Supplies Tags*", Zebra Technologies, http://www.zebra.com, pp. 1-2, printed Jun. 6, 2004.

"*IRUCG Detector / 940nm Light Source*", http://www.maxmax.com, pp. 1-4, printed Sep. 15, 2004.

* cited by examiner

ILLUMINATED DECODER

RELATED APPLICATIONS

The present application claims priority to U.S. Provisional Application No. 60/483,746 filed Jun. 30, 2003, the disclosures of which is hereby incorporated by reference in its entirety.

BACKGROUND OF THE INVENTION

Various methods have been proposed for protecting goods and documents from counterfeit protection. Some such methods include creating images which may be embedded and/or concealed as encoded, hidden images. The images cannot easily be seen, if at all, without the use of a special device to decode, or reveal, an authentication image when placed over the location of the encoded image. When a decoder is placed over a branded good, for example, at a location where an authentic product is known to contain an encoded image, a party may be able to verify the good's authenticity by whether or not the authentication image is revealed when one views the location through the decoder.

In many cases, a party interested in investigating whether or not a product or document is authentic may be conducting the investigation in a low light situation, such as a warehouse or shipyard where goods are often subject to inspection. Similarly, a police officer may want to determine the authenticity of a driver's license during a night time traffic stop along a dimly lit street. These low light situations can make authentication difficult.

SUMMARY OF THE INVENTION

Accordingly, it is desirable to have a decoder device that illuminates an encoded image for viewing when ambient light is low and viewing an encoded image through the decoder may be difficult without an additional light source.

An illustrative embodiment of the invention provides an illuminated decoder that comprises a housing, a lens attached to the housing, the lens being configured for optically decoding an encoded image viewable therethrough, and at least one light source attached to the housing to illuminate a surface containing the encoded image so that when the illuminated decoder is positioned to overlie the surface, the encoded image printed on the surface may be viewed through and decoded by the lens to reveal an authentication image.

DETAILED DESCRIPTION OF EXEMPLARY EMBODIMENTS

Figure 1:
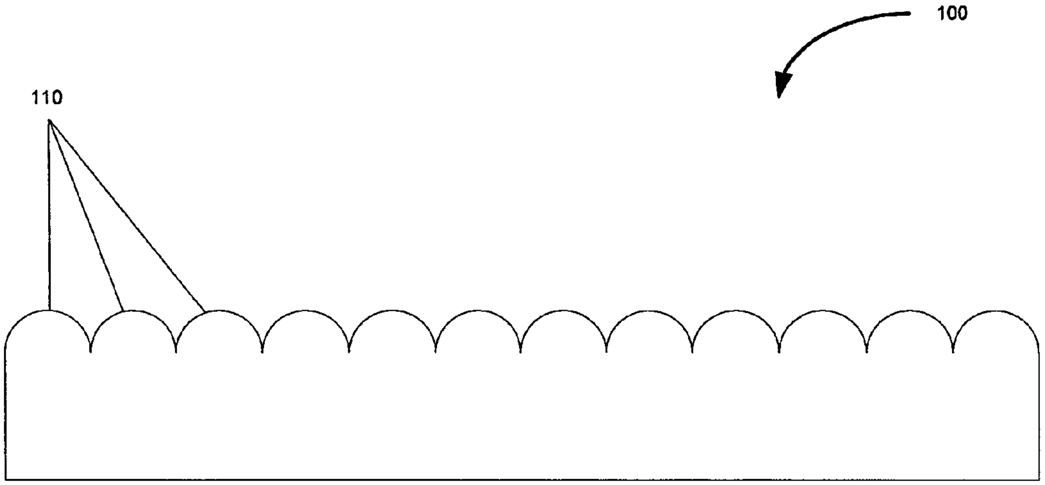
FIG. 1 shows a lenticular lens for use with an illuminated decoder in accordance with an exemplary embodiment of the invention.

Exemplary embodiments of the invention are directed to providing an illuminated decoder that can be used to decode encoded images in low light situations, when ambient light alone may be insufficient to reveal the encoded image as an authentication image. The illuminated decoder comprises a housing, a lens capable of decoding encoded images and a light source associated with the lens.

As used herein, the term "encoded image" refers to an authentication image printed in rasterized, scrambled or other manipulated form, such that when embedded and/or concealed in a document or in another printed background or source image, the authentication image cannot be discerned from the base document material or other background or source image without the use of an optical decoding device. An encoded image may be generated from an authentication image using a particular set of characteristics that include encoding parameters corresponding to certain optical characteristics of the decoding device. When the encoded image is printed, placement of the decoding device over the printed encoded image in a predetermined orientation reveals the authentication image. Without the decoding device, some or all of the encoded image may be visible, but the authentication image is indecipherable or indistinguishable from the background by the naked eye. In other cases, the presence of encoded image may also be indecipherable or indistinguishable from the background by the naked eye.

One method of producing encoded images is through a rasterization process such as that described in U.S. Pat. No. 5,708,717 (the '717 Patent), which is incorporated herein by reference in its entirety. Encoded images may be printed with a certain line density, called a frequency. In the '717 Patent method, digitized authentication images are encoded by rasterizing them according to a series of predetermined encoding parameters to produce an image having a particular line frequency. The line frequency corresponds to the number and spacing of regular line segments into which an image is divided (rasterized). The size and number of divisions determines the frequency (i.e., number of line segments per inch) of the encoded image.

The decoding device of the '717 Patent method and other encoding methods may be a lens, such as a lenticular lens for example, having optical characteristics matching those of an encoded image. In particular, the lenticular lens may be formed with a lens frequency that corresponds to the line frequency of the encoded image. When placed over the encoded image and rotated to a correct angular orientation to align the frequency of the lens to the frequency of the image, the encoded image is decoded, thereby allowing the authentication image(s) to be viewed.

Although the rasterization methods of the '717 Patent are referred to throughout this specification, it will be understood by those of ordinary skill in the art that any image encoding method having a set of definable image characteristics relatable to a decoding device with corresponding optical characteristics may be used to produce images for use in conjunction with the illuminated decoders of the present invention.

Likewise, although lenticular lenses are primarily referred to, it will be understood by those of ordinary skill in the art that other types of lenses with optical characteristics corresponding to the image characteristics of various encoded images may be used to decode the images.

Decoders and encoded images of matched-frequency are useful in various applications including the security printing and anti-counterfeiting industries. Products such as branded goods or important documents, such as driver's licenses, for example, may be printed to include encoded images having a particular frequency.

In low light situations, decoding encoded images may be made more difficult by the lack of ambient light. This may result in increased difficulty in determining whether an encoded image is present over and above normal decreased viewing ability in low light situations. Additionally, in certain situations, encoded images may be printed in ink that is not visible unless an external light source is used to produce light other than normal visible, ambient light. For example, encoded images may be printed with inks that are only visible when stimulated with ultra-violet or infrared light, which are not typically present in normal ambient light conditions. By using illuminated decoders in accordance with exemplary embodiments of the invention, the additional light source needed to more clearly determine whether an encoded image is present is conveniently provided, providing a faster and more accurate determination of whether an item is genuine.

As used herein, a "lens" is any device capable of altering the character of transmitted or reflected light. As light passes through a lens it undergoes two refractions. Refraction or bending of light occurs as light passes from one medium to another when there is a difference in the index of refraction between the two materials. As the light enters the lens, it passes from air into the lens material. The lens material has a different index of refraction from air causing the light to refract a first time. Then the light travels through the lens. At the other side of the lens, the light again refracts as it goes from the lens to air.

For example, as with the lenticular lens shown in FIG. 1, the surface of the lens 100 may be curved in such a manner as to direct the light in a certain direction, causing the light to refract at a predetermined angle. The angle of refraction depends on several factors, including the index of refraction of the lens material and the thickness of the lens with respect to the radius of curvature. Typically, for an acrylic lens, the thickness is about 3 times the radius of curvature.

FIG. 1 shows an exemplary embodiment of a lenticular lens 100 with a plurality of curvatures 110 designed to refract light entering the lens at a certain, predetermined angle based on the radius of the curvatures 110. The curvatures 110 have a uniform width that results in a lens frequency of a certain number of lines (i.e. curvatures) per inch. As light entering the lens 100 refracts as a result of the curvatures, an encoded image printed with the same number of lines per inch can be viewed by a user viewing the image through the lens 100 to reveal an authentication image.

Any type of lens having optical characteristics matching the encoded image can be used with exemplary embodiments of the present invention. For example, the lens may be a lenticular lens that has a single set of regularly spaced curvatures as shown in FIG. 1 or the lens may be a multi-sectioned decoder, having multiple layers of regularly spaced curvatures as described in more detail in U.S. Patent Publication 20030228014, which is hereby incorporated by reference in its entirety. Other exemplary lenses include those that have a lens frequency in two different planes or which have a frequency that varies across a horizontal face of the lens.

The lens may be made of any transparent material, such as glass or plastic, with a preference for acrylic lenses. Acrylic lenses are typically manufactured using injection molding techniques, using a mold to produce the curvatures of the lens. Other exemplary plastics useful for manufacturing lenses for use with embodiments of the present invention include polycarbonate and polypropylene. Typically, lenses of these materials are embossed with a pattern to produce the desired lens frequency.

To achieve a lens that permits an encoded image to be viewed as an authentication image with a high level of clarity, it may be desirable to have a lens thickness within a tolerance of plus or minus 5/1000 of an inch of the desired thickness to achieve the desired optical characteristics of the lens. Additionally, lenticular lenses typically have a lens frequency pattern accurate to greater than about 90% of the design frequency. For example, in an injection molded lenticular lens, the mold used to create lenses may deteriorate over time such that a lens made using the mold, and particularly the curvatures of the lens, may become deformed during manufacture. As long as about 90% or more the curvatures are properly formed, the lens may continue to provide a desirable level of decoding, although a level of accuracy of about 98% or greater is preferred.

Thus, a lens with a particular lens frequency can be used to decode encoded images with a matching line frequency, such as, by way of example only, by customs agents or private investigators verifying whether certain branded goods are genuine or counterfeit. For a particular branded good, the good's producer may know that it prints encoded images having a particular line frequency onto its product packaging. The producer may assign agents to attempt to decode encoded images on products bearing the brand of the producer using a lens that has a lens frequency corresponding to the line frequency of the encoded image for the product under investigation. If an encoded image is present and thus an authentication image is revealed when the good is viewed through the decoder, the goods' authenticity is verified, while if an image is not present, the goods have been identified as a likely counterfeit.

Often, these investigations may be conducted in environments where ambient light is low, for example, in dimly lit warehouses. In low light situations, it may be difficult to determine whether or not an encoded image is present by viewing through the lens without an additional source of light. By using illuminated decoders in accordance with exemplary embodiments of the invention, the additional light source needed to more clearly determine whether an encoded image is present is conveniently provided, providing a faster and more accurate determination of whether an item is genuine.

Furthermore, using a light source to illuminate the encoded image may improve the overall clarity of the authentication image revealed to a person viewing the image versus one viewing the image through a decoder using only ambient light, even when ambient light is relatively intense.

In order to better view encoded images in low light situations, at least one light source may be associated with the lens, providing an illuminated decoder that casts light onto a surface below the decoder, providing sufficient light to make any encoded image printed thereon viewable. The light source may be any light source, such as one or more light bulbs or light emitting diodes (LEDs) for example.

The light source is associated with the lens to create a single unit, typically through the use of a housing or overlay that attaches to both the light source and the lens. In certain exemplary embodiments, the lens, the light source or both, may be contained within the housing. Unlike the lens, which is substantially transparent in order to view through the lens, the housing is at least translucent, and preferably opaque to keep light from entering or exiting the housing except through apertures designed to permit a viewer to see through the lens. The housing may be manufactured from various materials, but typically comprises one or more injection molded rigid, plastic pieces.

Figure 2A:
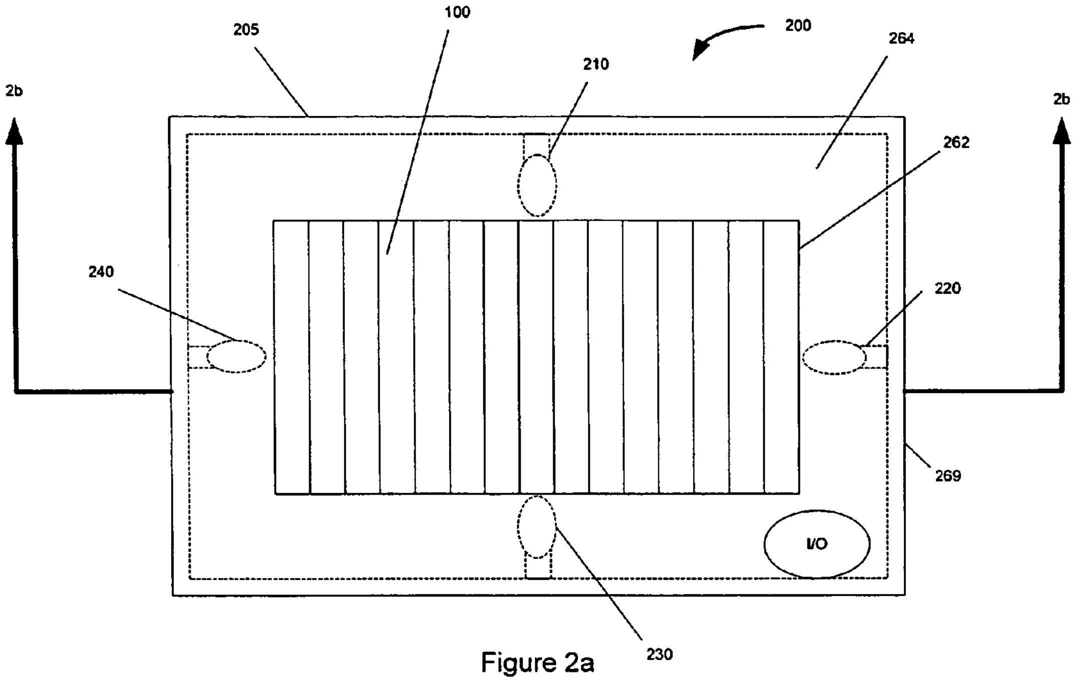
FIG. 2*a* is a top view of an illuminated decoder according to one exemplary embodiment of the invention.
Figure 2B:
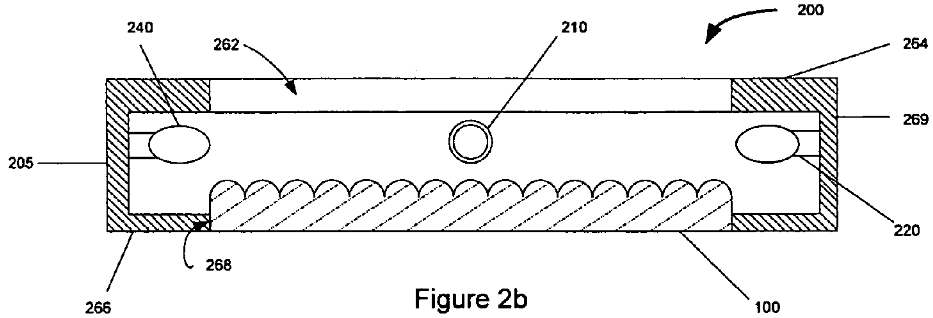
FIG. 2*b* is a cross-sectional view of the illuminated decoder of FIG. 2*a*.

An exemplary embodiment of an illuminated decoder is shown in FIGS. 2*a* and 2*b*. The illuminated decoder 200 comprises a housing 205, and a lenticular lens 100 and light sources 210-240 attached to the housing 205. The housing 205 may also contain a battery (not shown) or other power source connected to the light sources. The light sources 210-240 are attached to the interior of side walls 269 of the housing 205 in a plane orthogonal to the lens 100, although they need not be so oriented.

FIG. 2*b* shows a cross-sectional view of the illuminated decoder of FIG. 2*a*. The housing 205 includes a top wall 264 and a bottom wall 266, along with four side walls 269. The top wall 264 contains a top aperture 262, while the bottom wall 266 contains a bottom aperture 268, the bottom aperture 268 is sized and configured to accept the lens 100. The two apertures 262, 268 are in registration with one another such that the lens 100 is viewable through the top aperture 262 and a person using the illuminated decoder 200 can see through the lens 100 to a surface below. The lens 100 may be attached to the housing 205 using an adhesive, a friction connection, or in some other manner.

The housing 205 has a top wall 264 surrounding the top aperture 262 that acts as a shield so that the light sources 210-240 are partially or fully shielded from the eyes of a person viewing through the illuminated decoder 200 positioned over an encoded image. The top wall 264 or side walls 269 may be configured to direct light toward the bottom aperture 268, such as by a reflective coating applied to an interior surface of the top wall 264 or by modifying the angle of the interior side walls as shown in FIG. 3*a* and 3*b*.

Figure 3A:
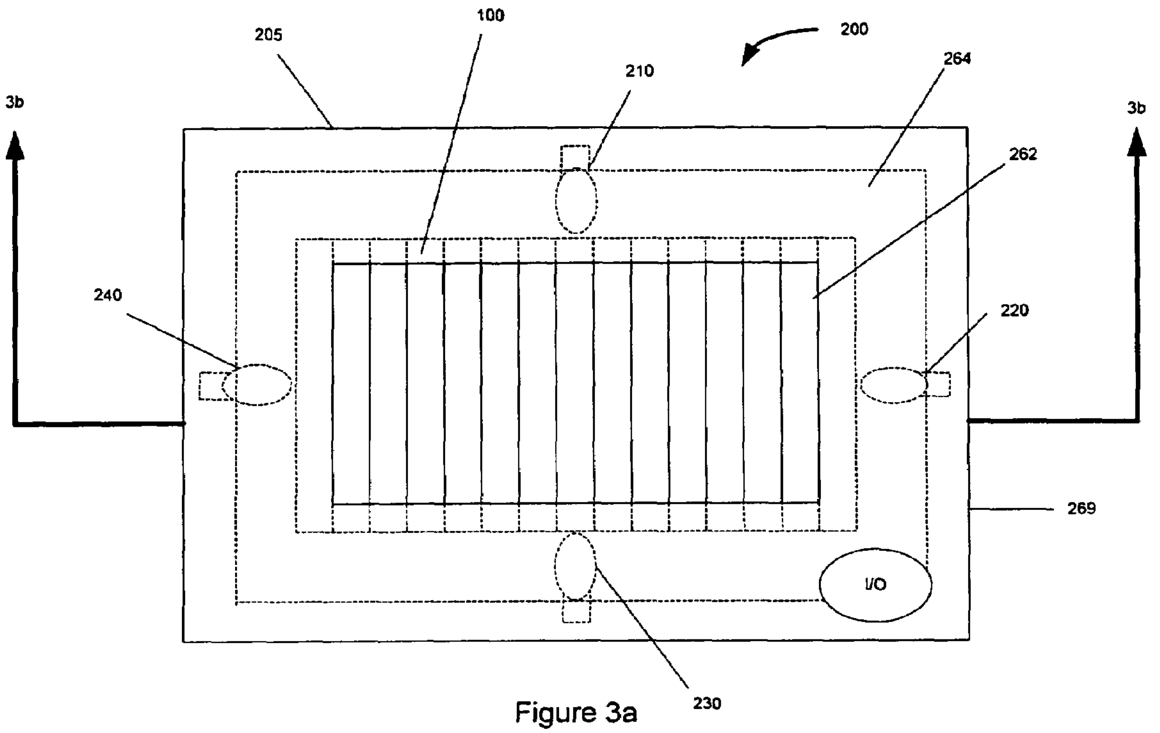
FIG. 3*a* is a top view of an illuminated decoder according to one exemplary embodiment of the invention.
Figure 3B:
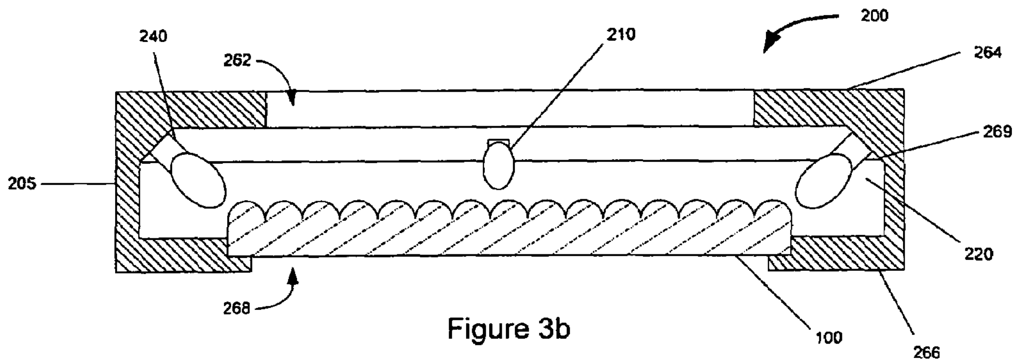
FIG. 3*b* is a cross-sectional view of the illuminated decoder of FIG. 3*a*.

FIGS. 3*a* and 3*b* illustrate another exemplary embodiment in which the interior side walls 269 are angled to direct light from the light sources 210-240 toward the bottom aperture 268. FIG. 3*b* also shows that in certain embodiments, the lens 100 may be contained entirely within the housing 205, the bottom wall 266 supporting the lens 100 above the bottom aperture 268.

Figure 4A:
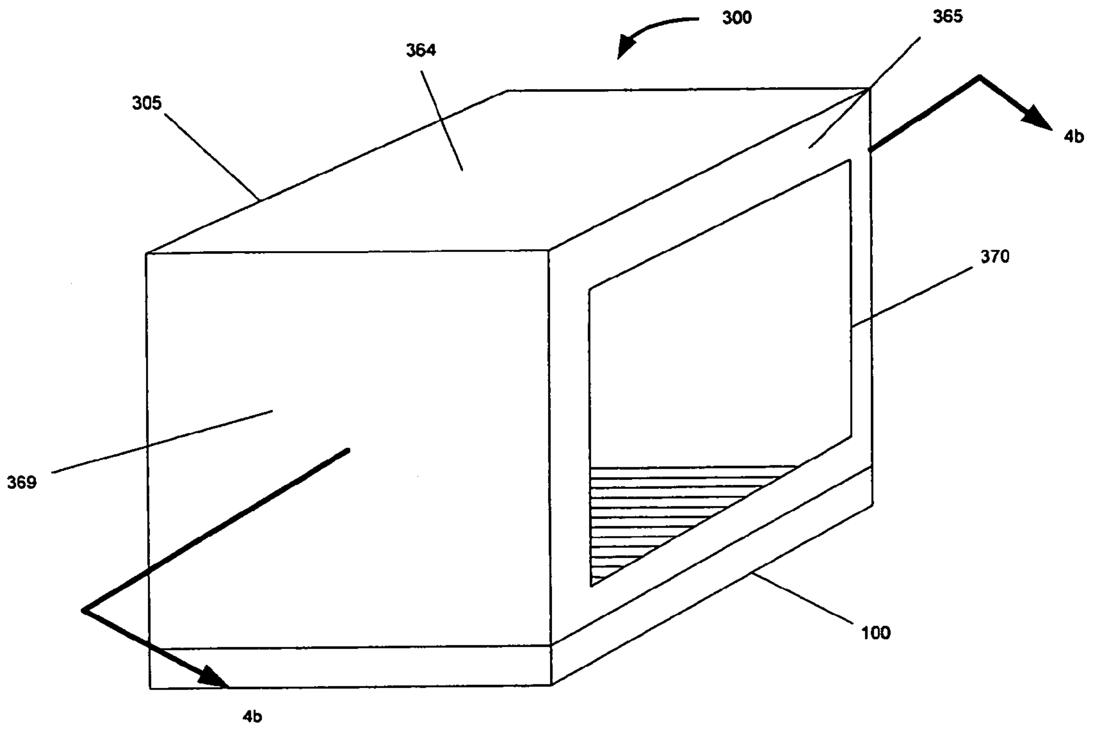
FIG. 4*a* is a perspective view of an illuminated decoder according to another exemplary embodiment of the invention.
Figure 4B:
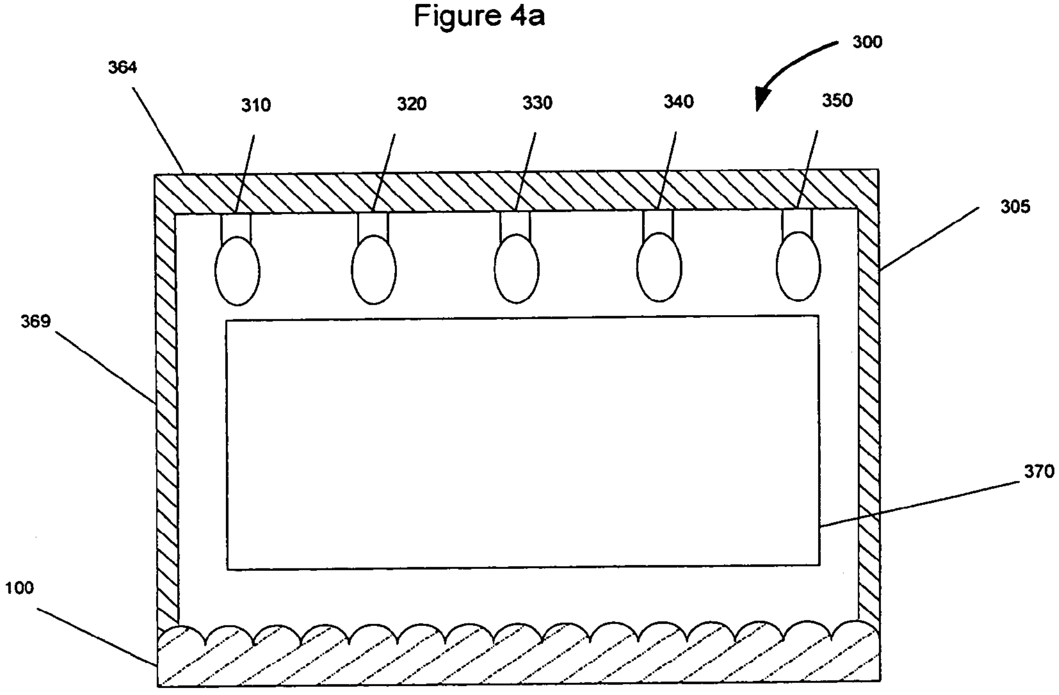
FIG. 4*b* is a cross-sectional view of the illuminated decoder of FIG. 4*a*.

An exemplary embodiment of another illuminated decoder is shown in FIGS. 4*a* and 4*b*. FIG. 4*a* is a perspective view of an illuminated decoder 300 having light sources attached to a housing 305 above a lenticular lens 100. The housing 305 is mounted over the lens 100. The housing 305 has a top wall 364 and four side walls 369. It should be appreciated that in this and other embodiments, the number of side walls 369 may be greater or fewer than four depending on the desired geometry of the illuminated decoder 300.

A cross-sectional view of the illuminated decoder of FIG. 4*a* is shown in FIG. 4*b*. As shown in FIG. 4*b*, the housing 305 has an open bottom. In this exemplary embodiment, the housing 305 is attached to the lens 100 such that the lens 100 forms a bottom wall of the illuminated decoder 300. Multiple light sources 310-350 are attached to the top wall of the housing 305 opposite the lens 100 and configured to shine therethrough.

As shown in FIGS. 4*a* and 4*b*, when the light sources 310-350 are opposite the lens 100, it may be advantageous to have a side aperture 370 in one of the sidewalls 369 of the housing 305. Although the aperture 370 is shown in a plane orthogonal to the plane of the lens 100, the aperture 370 need not be so arranged, and may be configured at angle, as shown in FIG. 5 for example.

Figure 5:
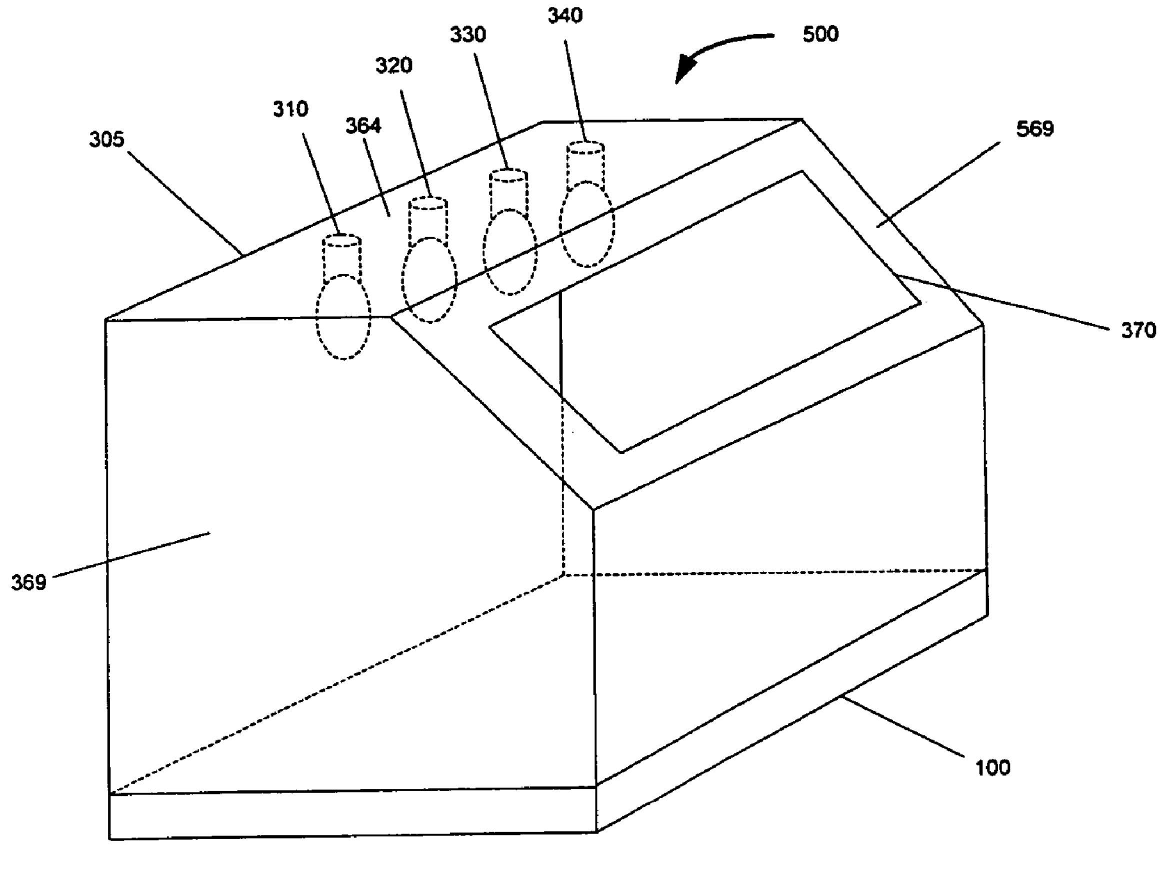
FIG. 5 is a perspective view of an illuminated decoder according to another exemplary embodiment of the invention.

FIG. 5 shows an exemplary embodiment of an illuminated decoder 500 that is in many respects similar to the illuminated decoder 300 of FIGS. 4*a* and 4*b*. However, in FIG. 5, the illuminated decoder has an angled side wall 569 containing a side aperture 370 for viewing through the illuminated decoder to a surface beneath the lens 100.

As described with respect to other exemplary embodiments of the invention, in embodiments where a side wall includes a side aperture, the side aperture may be positioned such that the side wall shields a viewer's eyes from directly viewing the light source when the viewer looks through the illuminated decoder at a surface containing an encoded image. Accordingly, the side aperture is preferably placed at a distance from the top wall that conceals the light sources from direct view.

Often, a lens used to decode encoded images may first need to be rotated to a correct orientation to reveal the authentication image. In some cases, it may not be possible for a user inspecting a good or document to rotate the decoder and still easily see through the illuminated decoder, for example, when using an exemplary embodiment of an illuminated decoder having a single side aperture. As the illuminated decoder is rotated, a user would either have to move along with the decoder to continue viewing through the side aperture, or rotate the item being viewed so that the illuminated decoder, and thus the side aperture, is held in place.

Figure 6A:
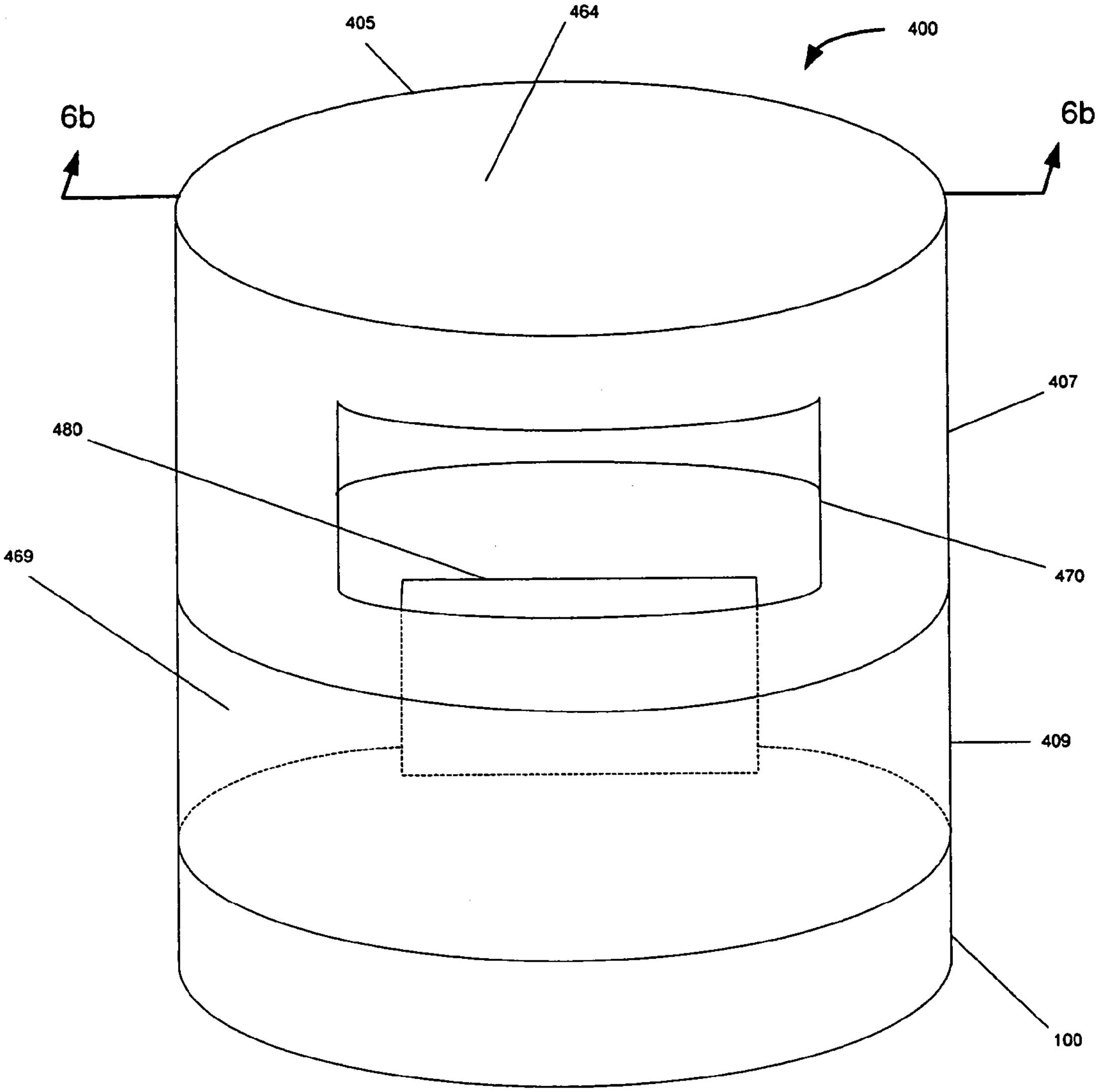
FIG. 6*a* is a perspective view of an illuminated decoder according yet another exemplary embodiment of the invention.
Figure 6B:
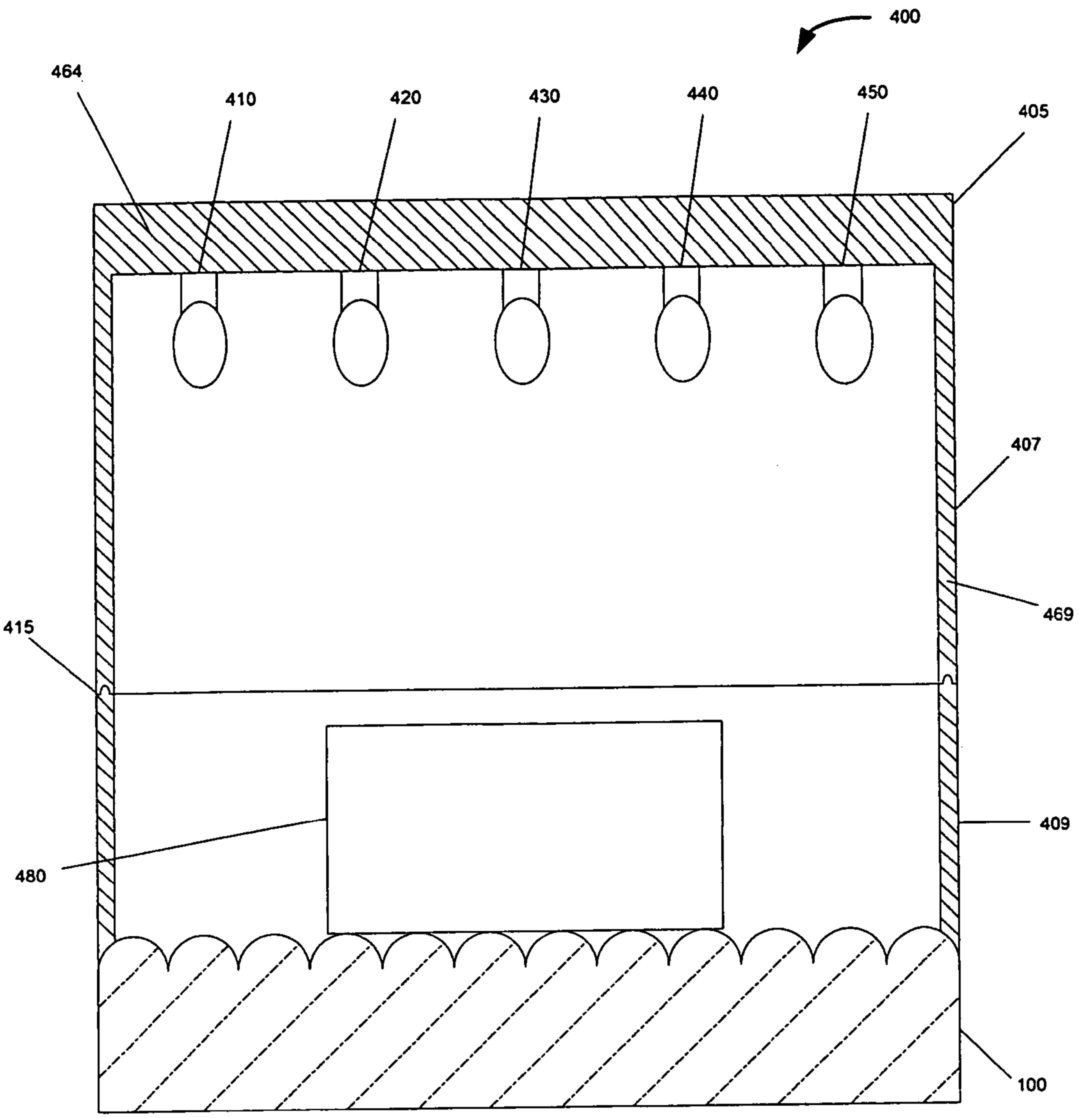
FIG. 6*b* is a cross-sectional view of the illuminated decoder of FIG. 6*a*.

In certain situations, such as inspecting goods in a warehouse, either or both the user and the item under inspection may have limited mobility. To alleviate this problem, two or more top or side apertures may be used, such that the illuminated decoder can be viewed through from more than one direction. Alternatively, yet another embodiment of illuminated decoder, as shown in FIGS. 6*a* and 6*b*, may conveniently be used. In this embodiment, the illuminated decoder further comprises one or mirrors to reflect the image seen when viewing through the decoder and the decoder can be rotated to direct the reflected image toward a viewer's eyes.

FIG. 6*a* shows an illuminated decoder 400 that has a housing 405 that includes a top wall 464 and a side wall 469. The housing 405 comprises a top section 407 and a base section 409. A lens 100 is attached to the base section 409 to form a bottom wall of the illuminated decoder 400. A side aperture 470 is located in the side wall 469 of the top section 407 of the housing 405. As shown in more detail in FIG. 4*b*, the base section 409 and top section 407 are rotatably attached to one another, such as, for example, by a male/female connection 415. In this manner, the base section 409 and the lens 100 attached thereto can be manually rotated while the top section 407 is held in place.

A mirror 480 attached to the base section 409 is positioned to reflect light, and hence any authentication image, back through the viewing aperture 470 as the base section 409 and lens 100 are rotated over an encoded image. Depending on the dimensions of the housing 405, and the angle of the mirror 480, it may be necessary to use two or more mirrors to reflect light from the light sources 410-450 back through the side aperture 470 such that an authentication image can easily be viewed.

It should be appreciated that in certain embodiments, the illuminated decoder may be configured so that only the lens 100 rotates, while the entire housing 405 is held in place.

The light source used in various embodiments of the invention may produce any kind of light, including visible, infrared, or ultraviolet light.

It should be appreciated that the light from the light source used in the illuminated decoder must match the type of ink used to print the encoded image for an authentication image to be revealed. For example, various types of ink may be used to print encoded images, including those which can viewed in the visible light range only when first stimulated by non-visible light, such as infrared or ultraviolet light. If the ink used to print encoded images is the type of ink that can only be seen when exposed to infrared light, then the light source must contain light with an infrared component to make the encoded image appear in the visible light range while the decoder reveals the authentication image. Likewise, if the encoded image is printed with cyan ink, then the light must have a visible light component.

In embodiments where light from the light source is other than visible light, it may be particularly desirable to contain as much of that light within the housing as possible. Thus, it may also be desirable to exclude excess ambient light from entering the housing, while still including housing apertures for a person to view through the lens. Ambient visible light may have the effect of diluting the non-visible light from the light source, decreasing the visibility of the encoded image and hence, the revealed authentication image. This may be overcome, for example, by making the housing completely opaque and/or reducing the size of the housing apertures.

Thus, embodiments of the present invention may be particularly advantageous when used to decoded encoded images printed with infrared or ultraviolet inks, as discussed in more detail in copending U.S. patent application Ser. No. 10/810,000, which is incorporated herein by reference in its entirety, regardless of the intensity of ambient visible light. When these types of inks are used to create the encoded image, the image may not be viewable in visible light at all, regardless of the amount of ambient light, because the ink is not visible unless first stimulated by light outside of the visible range, usually by a particular wavelength of light. By using an illuminated decoder with a light source that produces a particular wavelength of non-visible light that corresponds to the ink used to print the encoded image, the encoded image both appears in the visible light range and is decoded to reveal an authentication image at the same time through the use of the illuminated decoder.

If light outside the visible range is used, the material used for the lens of the illuminated decoder should be selected such that it has a high transmittance of the non-visible light source. For example, some materials have a low transmittance of ultra-violet light. Thus, if the illuminated decoder is used to reveal images printed with ink that appears in the visible range when exposed to ultra-violet light, a lens material should be used that transmits a high percentage of that type of light through the lens. One type of resin useful for making a lens with both a high ultra-violet and infrared transmission is the polymethylmethacrylate available as ACRYLITE H15-012 from Cryo Industries, Woodcliff Lake, N.J., USA. Those of ordinary skill in the art will appreciate that other resins with high transmittance outside the visible light range are available and could also be used to produce a lens for use in exemplary embodiments of illuminated decoders of the present invention.

Light filters may be added to the illuminated decoder to enhance the visibility of encoded images and make the authentication images more readily viewable when revealed. Examples of filters include additive or subtractive dichoric filters that enhance various colors used to print the encoded image. Likewise, a polarized filter may be used to enhance contrast, making the features of the encoded image more readily visible. The filters may be applied to the lens, to the light source, or across an aperture of the illuminated decoder such that the filters are somewhere within the path of the light as it travels from the light source to the viewer's eye.

In addition to the type of light emitted from the light source, the type of light source itself can be varied. In many cases, the light source may be an LED, incandescent bulb, fluorescent bulb, or halogen bulb. LEDs are preferred because they are typically of small size, but still produce a substantial amount of light versus the amount of power they consume.

Power can be delivered to the light source by any electrical power source, although battery power is preferred to make the illuminated decoder mobile, independent of its proximity to a stagnant power supply, such as an electrical outlet. The power source may be contained within a compartment of the housing of the illuminated decoder to hide it from view. The power supplied to the light source can be switched on or off using a switching device.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes.

What is claimed is:

1. An illuminated decoder comprising:

a housing;

a lens attached to the housing, the lens being configured for optically decoding an encoded image viewable therethrough; and a plurality of light sources attached to the housing, all light sources being positioned within the housing to emit light through the lens to illuminate a surface containing the encoded image so that when the illuminated decoder is positioned to overlie the surface, the encoded image printed on the surface may be viewed through and decoded by the lens to reveal an authentication image to an observer positioned on the same side of the lens as the plurality of light sources.

2. The illuminated decoder of claim 1, wherein the housing comprises a top wall and at least one side wall, wherein at least one of the top wall or at least one side wall contains an aperture.

3. The illuminated decoder of claim 2, further comprising a bottom wall containing an aperture, wherein the bottom wall is configured to accept the lens.

4. The illuminated decoder of claim 3, wherein the top wall contains a top aperture for viewing the encoded image, the top aperture in a plane parallel to the lens.

5. The illuminated decoder of claim 2, wherein at least one side wall contains a side aperture for viewing the encoded image.

6. The illuminated decoder of claim 5, wherein the side aperture is in a plane orthogonal to the lens.

7. The illuminated decoder of claim 1, wherein at least one of the plurality of light sources emits light selected from the group consisting of infrared light and ultraviolet light.

8. The illuminated decoder of claim 1, wherein the plurality of light sources comprises one or more devices selected from the group consisting of incandescent bulbs, fluorescent bulbs, light-emitting diodes, and halogen bulbs.

9. The illuminated decoder of claim 1, wherein the housing comprises a shield at least partially concealing the plurality of light sources from eyes of a person viewing through the lens.

10. The illuminated decoder of claim 1, wherein the light sources are attached to the housing in a plane orthogonal to the lens.

11. The illuminated decoder of claim 1, further comprising at least one mirror attached to the housing.

12. The illuminated decoder of claim 1, wherein the lens is capable of being rotated relative to at least a portion of the housing.

13. The illuminated decoder of claim 12, wherein the housing comprises a top section and a base section, the lens attached to the base section of the housing, the base section rotatably attached to the top section to allow rotation of the base section and the lens relative to the top section.

14. The illuminated decoder of claim 1, wherein the lens is a lenticular lens.

15. The illuminated decoder of claim 1, wherein the lens is a multi-section lens.

16. The illuminated decoder of claim 1, wherein the lens has a lens frequency corresponding to a line frequency of the encoded image.

17. The illuminated decoder of claim 1, further comprising a light filter.

18. The illuminated decoder of claim 1, wherein each of the plurality of light sources emits light through the lens at a different angle.

19. An illuminated viewing device comprising:

a housing;

a lens attached to the housing, the lens being configured for viewing indicia comprising an authentication image therethrough; and a plurality of light sources attached to the housing, all light sources being positioned within the housing to emit light through the lens to illuminate a surface to which the indicia has been applied when the illuminated viewing device is positioned to overlie the surface so an observer positioned on the same side of the lens as the plurality of light sources can view the illuminated indicia comprising the authentication image therethrough.

* * * * *

UNITED STATES PATENT AND TRADEMARK OFFICE

CERTIFICATE OF CORRECTION

PATENT NO. : 7,634,104 B2
APPLICATION NO. : 10/872232
DATED : December 15, 2009
INVENTOR(S) : Alasia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1540 days.

Signed and Sealed this

Ninth Day of November, 2010

David J. Kappos

*Director of the United States Patent and Trademark Office*